United States Patent
Naserian et al.

(10) Patent No.: US 12,243,426 B2
(45) Date of Patent: Mar. 4, 2025

(54) VEHICLE WARNING SYSTEM FOR ACTUATING A MOBILE DEVICE TO ALERT A VULNERABLE ROAD USER OF A PREDICTED COLLISION WITH A HIDDEN APPROACHING VEHICLE

(71) Applicant: GM Global Technology Operations LLC, Detroit, MI (US)

(72) Inventors: Mohammad Naserian, Windsor, CA (US); Jie Zhu, Shanghai (CN); Feiyu Cong, Shanghai (CN); Jinzhu Chen, Troy, MI (US); An Xu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 226 days.

(21) Appl. No.: 18/152,846

(22) Filed: Jan. 11, 2023

(65) Prior Publication Data

US 2024/0203256 A1    Jun. 20, 2024

(30) Foreign Application Priority Data

Dec. 15, 2022    (CN) .......................... 202211620284.5

(51) Int. Cl.
*G08G 1/16*    (2006.01)
*G01S 13/02*    (2006.01)
(Continued)

(52) U.S. Cl.
CPC .......... *G08G 1/161* (2013.01); *G01S 13/0209* (2013.01); *G08B 7/06* (2013.01);
(Continued)

(58) Field of Classification Search
CPC ........ G08G 1/161; G08G 1/166; G08G 1/005; G08G 1/0125; G01S 13/0209;
(Continued)

(56) References Cited

U.S. PATENT DOCUMENTS 12,118,889 B2 * 10/2024 Naserian ................ G08G 1/166
2016/0343256 A1 * 11/2016 Song ..................... H04W 4/029
(Continued)

FOREIGN PATENT DOCUMENTS

CN         115171387 A  * 10/2022

OTHER PUBLICATIONS

English Translation of CN-115171387-A (Year: 2024).*

*Primary Examiner* — Rami Khatib
(74) *Attorney, Agent, or Firm* — Vivacqua Crane, PLLC

(57) ABSTRACT

A warning system is provided for alerting a VRU of a predicted collision. The system includes one or more input devices for transmitting first and second input signals for associated first and second vehicles. The system further includes a UWB beacon communicating with a UWB tag of a VRU notification device carried by the VRU. A location of the UWB tag is trackable via a third input signal. The system further includes a computer having one or more processors and a non-transitory computer readable medium. The processor is programmed to determine the location of the VRU and further determine the predicted collision between the second vehicle and the VRU. The processor is further programmed to generate a notification actuation signal associated with the VRU at a tracked location. The VRU notification device notifies the VRU that the second vehicle is headed toward the predicted collision site in the crosswalk.

17 Claims, 2 Drawing Sheets

(51) Int. Cl.
*G08B 7/06* (2006.01)
*H04W 4/029* (2018.01)
*H04W 4/12* (2009.01)
*H04W 4/80* (2018.01)
*H04W 4/90* (2018.01)

(52) U.S. Cl.
CPC ............ *G08G 1/166* (2013.01); *H04W 4/029* (2018.02); *H04W 4/12* (2013.01); *H04W 4/80* (2018.02); *H04W 4/90* (2018.02)

(58) Field of Classification Search
CPC ................... G01S 7/003; G01S 17/931; G01S 2013/9316; G01S 2013/9323; G01S 2013/93271; G01S 13/931; G08B 7/06; H04W 4/029; H04W 4/12; H04W 4/80; H04W 4/90
See application file for complete search history.

(56) References Cited

U.S. PATENT DOCUMENTS

| | | |
|---|---|---|
| 2017/0268896 A1 | 9/2017 | Bai et al. |
| 2018/0286223 A1 | 10/2018 | Ova et al. |
| 2019/0037449 A1 | 1/2019 | Fujishiro et al. |
| 2019/0208449 A1 | 7/2019 | Wang |
| 2019/0287396 A1 | 9/2019 | Sayin et al. |
| 2021/0063546 A1 | 3/2021 | Slobodyanyuk et al. |
| 2021/0158687 A1* | 5/2021 | Beauchamp ............. G06N 3/08 |
| 2022/0066051 A1 | 3/2022 | Hirohata |
| 2022/0388505 A1 | 12/2022 | Sharma Banjade et al. |
| 2023/0003864 A1* | 1/2023 | Tertinek ................... B60L 53/36 |
| 2023/0064517 A1* | 3/2023 | Weston ................... G08G 1/005 |
| 2024/0203252 A1* | 6/2024 | Baek ................. G08G 1/096783 |
| 2024/0203259 A1* | 6/2024 | Baek ....................... G08G 1/056 |
| 2024/0203260 A1* | 6/2024 | Baek ....................... G08G 1/005 |
| 2024/0233546 A9* | 7/2024 | Naserian ................ G08G 1/005 |

\* cited by examiner

VEHICLE WARNING SYSTEM FOR ACTUATING A MOBILE DEVICE TO ALERT A VULNERABLE ROAD USER OF A PREDICTED COLLISION WITH A HIDDEN APPROACHING VEHICLE

CROSS-REFERENCE TO RELATED APPLICATION

This application claims priority to Chinese Application number 2022116202845, filed Dec. 15, 2022. The contents of the application are incorporated herein by reference in its entirety.

INTRODUCTION

The present disclosure relates to warning systems for alerting a Vulnerable Road User ("VRU") of a predicted collision, and more particularly to a warning system for alerting the VRU of the predicted collision with an approaching vehicle where another vehicle blocks a line of sight between the VRU and the approaching vehicle.

Modern vehicles can include a Pedestrian Detection system ("PD system") with Automated Emergency Braking to prevent imminent collisions between the vehicle and the VRU. Examples of VRUs include individuals located on or alongside a roadway without the protective rigid covering of a metal automobile (e.g., a pedestrian, a roadway worker, an individual operating a wheelchair or other personal mobility device, whether motorized or not, an individual operating an electric scooter or the like, an individual operating a bicycle or other non-motorized means of transportation, and individuals operating a motorcycle, etc.). The PD system can include one or more notification devices that alert the driver of a vehicle that a collision between the VRU and the vehicle is imminent. The notification devices can provide a visual warning, an audible warning, or a tactile warning perceived by the driver. However, these systems do not alert third parties, e.g., the VRUs, particularly when another vehicle is blocking a line of sight between the host vehicle and the VRU.

Thus, while the current PD systems achieve their intended purpose, there is a need for a new and improved warning system that addresses these issues.

SUMMARY

According to several aspects, a warning system is provided for alerting a Vulnerable Road User (VRU) of a predicted collision. The warning system includes one or more input devices for transmitting a first input signal associated with a first vehicle positioned in a first lane of a roadway. The input devices further transmit a second input signal associated with a second vehicle positioned in a second lane of the roadway adjacent to the first lane. The warning system further includes an Ultra Wideband beacon (UWB beacon) capable of being attached to the first vehicle. The UWB beacon communicates with an Ultra Wideband tag (UWB tag) of a VRU notification device that is carried by the VRU. A location of the UWB tag is trackable by way of a third input signal. The warning system further includes a computer capable of being attached to the first vehicle. The computer includes one or more processors communicating with the input device and receiving the first and second input signals from the input device. The processor further communicates with the UWB beacon and receives the third input signal from the UWB beacon. The computer further includes a non-transitory computer readable storage medium (CRM) for storing instructions, such that the processor is programmed to: determine the location of the VRU in response to the processor receiving the third input signal from the UWB beacon. The processor is further programmed to determine the predicted collision between the second vehicle and the VRU at a predicted collision site within a predicted time-to-collision based on the second and the third input signals. The processor is further programmed to generate a notification actuation signal, in response to the processor determining the predicted collision. The notification actuation signal is associated with the VRU positioned at a tracked location. The VRU notification device compares the location of the VRU notification device to the tracked location associated with the notification actuation signal, in response to the VRU notification device receiving the notification actuation signal from the processor. The VRU notification device notifies the VRU that the second vehicle is headed toward the predicted collision site in the crosswalk, in response to the VRU notification device determining that the location of the VRU notification device matches the tracked location of the VRU notification device.

In one aspect, the UWB beacon transmits the notification actuation signal to the VRU notification device, in response to the processor determining that a calculated positioning and a movement of the UWB tag are matching one another.

In another aspect, the UWB beacon transmits the notification actuation signal to the VRU notification device, in further response to the processor determining that the VRU notification device is being used by the VRU.

In another aspect, the warning system further includes a vehicle notification device attached to the first vehicle. The vehicle notification device receives the notification actuation signal, in response to the processor determining that the calculated positioning and the movement of the UWB tag are not matching one another. The vehicle notification device notifies the VRU that the second vehicle is headed toward the predicted collision site in the crosswalk, in response to the vehicle notification device receiving the notification actuation signal from the processor.

In another aspect, the vehicle notification device receives the notification actuation signal, in response to the processor determining that the VRU notification device is not being used by the VRU.

In another aspect, the vehicle notification device includes a display device for displaying a visible alert related to the VRU and/or a speaker for emitting an audible alert related to the VRU.

In another aspect, the UWB beacon broadcasts a UWB region request message, in response to the UWB beacon receiving a first broadcast actuation signal from the processor. The UWB beacon receives a UWB renew response message from the VRU notification device, with the UWB renew response message including a temporary identification and a VRU status associated with the VRU notification device.

In another aspect, the processor is further programmed to determine the location, an azimuth, the temporary identification, and the VRU status of the VRU notification device based on the return message. The processor is further programmed to determine that the VRU is travelling toward the predicted collision site in the crosswalk, in response to the processor determining the location, the azimuth, the temporary identification, and the VRU status of the VRU notification device. The processor is further programmed to generate the notification actuation signal, in further response to the processor determining that the VRU is travelling toward the predicted collision site in the crosswalk.

In another aspect, the processor is further programmed to determine that the first vehicle has a heading toward the VRU and the first vehicle is waiting for the VRU to travel across the crosswalk, in response to the processor receiving the first and third input signals from the input device. The processor is further programmed to generate the notification actuation signal, in further response to the processor determining that the first vehicle has a heading toward the VRU and the first vehicle is waiting for the VRU to travel across the crosswalk.

In another aspect, the processor is further programmed to determine that the second vehicle is travelling toward the predicted collision site in the crosswalk, in response to the processor receiving the second and third input signals from the input device. The processor is further programmed to generate the notification actuation signal, in further response to the processor determining that the second vehicle is travelling toward the predicted collision site in the crosswalk.

In another aspect, the processor is further programmed to determine a predicted time-to-collision (predicted TTC), in response to the processor receiving the first and third input signals from the input device. The processor is further programmed to compare the predicted TTC to a predetermined time threshold. The processor is further programmed to generate the notification actuation signal, in further response to the processor determining that the predicted TTC is less than the predetermined time threshold.

In another aspect, the processor is further programmed to determine that the second vehicle is located at a closing distance from the predicted collision site, in response to the processor receiving the second and third input signals from the input device. The processor is further programmed to compare the closing distance to a predetermined distance threshold. The processor is further programmed to generate the notification actuation signal, in further response to the processor determining that the closing distance is less than the predetermined distance threshold.

In another aspect, the VRU notification device includes a display device for displaying a visible alert related to the VRU, a speaker for emitting an audible alert related to the VRU, and/or a haptic device.

According to several aspects, a computer is provided for a warning system for alerting a Vulnerable Road User (VRU) of a predicted collision. The warning system includes one or more input devices and an Ultra Wideband beacon (UWB beacon) capable of being attached to the first vehicle. The computer includes one or more processors communicating with the input device and receiving first and second input signals from the input device. The first input signal is associated with a first vehicle positioned in a first lane of a roadway. The second input signal is associated with a second vehicle positioned in a second lane of the roadway adjacent to the first lane. The processor further communicates with the UWB beacon that is capable of being attached to the first vehicle. The UWB beacon receives a third input signal from a UWB tag of a VRU notification device that is carried by the VRU. A location of the UWB tag is trackable by way of a third input signal. The computer further includes a non-transitory computer readable storage medium (CRM) for storing instructions, such that the processor is programmed to determine the location of the VRU in response to the processor receiving the third input signal from the UWB beacon. The processor is further programmed to determine the predicted collision between the second vehicle and the VRU at a predicted collision site within a predicted time-to-collision based on the second and the third input signals. The processor is further programmed to generate a notification actuation signal, in response to the processor determining the predicted collision. The notification actuation signal is associated with the VRU positioned at a tracked location. The VRU notification device compares the location of the VRU notification device to the tracked location associated with the notification actuation signal, in response to the VRU notification device receiving the notification actuation signal from the processor. The VRU notification device notifies the VRU that the second vehicle is headed toward the predicted collision site in the crosswalk, in response to the VRU notification device determining that the location of the VRU notification device matches the tracked location of the VRU notification device.

In one aspect, the processor is further programmed to transmit the notification actuation signal to the VRU notification device, in response to the processor determining that a calculated positioning and a movement of the UWB tag are matching one another.

In another aspect, the processor is further programmed to transmit the notification actuation signal to the VRU notification device, in further response to the processor determining that the VRU notification device is being used by the VRU.

In another aspect, the processor is programmed to transmit the notification actuation signal to a vehicle notification device attached to the first vehicle, in response to the processor determining that the calculated positioning and the movement of the UWB tag are not matching one another and in further response to the processor determining that the VRU notification device is not being used by the VRU.

According to several aspects, a method is provided for operating a warning system for alerting a Vulnerable Road User (VRU) of a predicted collision. The warning system includes one or more input devices, a UWB beacon, and a computer. The computer includes a non-transitory computer readable storage medium (CRM) and one or more processors. The method includes determining, using the processor, the location of the VRU in response to the processor receiving the third input signal from the UWB beacon. The method further includes determining, using the processor, the predicted collision between the second vehicle and the VRU at a predicted collision site within a predicted time-to-collision based on the second and the third input signals. The method further includes generating, using the processor, a notification actuation signal in response to the processor determining the predicted collision. The notification actuation signal is associated with the VRU positioned at a tracked location. The method further includes comparing, using the VRU notification device, the location of the VRU notification device to the tracked location associated with the notification actuation signal, in response to the VRU notification device receiving the notification actuation signal from the processor. The method further includes notifying, using the VRU notification device, the VRU that the second vehicle is headed toward the predicted collision site in the crosswalk, in response to the VRU notification device determining that the location of the VRU notification device matches the tracked location associated with the notification actuation signal.

In one aspect, the method further includes transmitting, using the UWB beacon, the notification actuation signal to the VRU notification device, in response to the processor determining that a calculated positioning and a movement of the UWB tag are matching one another. The method further includes transmitting, using the UWB beacon, the notification actuation signal to the VRU notification device in further response to the processor determining that the VRU notification device is being used by the VRU.

In another aspect, the method further includes receiving, using a vehicle notification device attached to the first vehicle, the notification actuation signal in response to the processor determining that the calculated positioning and the movement of the UWB tag are not matching one another and in further response to the processor determining that the VRU notification device is not being used by the VRU. The method further includes notifying, using the VRU notification device, the VRU that the second vehicle is headed toward the predicted collision site in the crosswalk in response to the vehicle notification device receiving the notification actuation signal from the processor.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Figure 1:
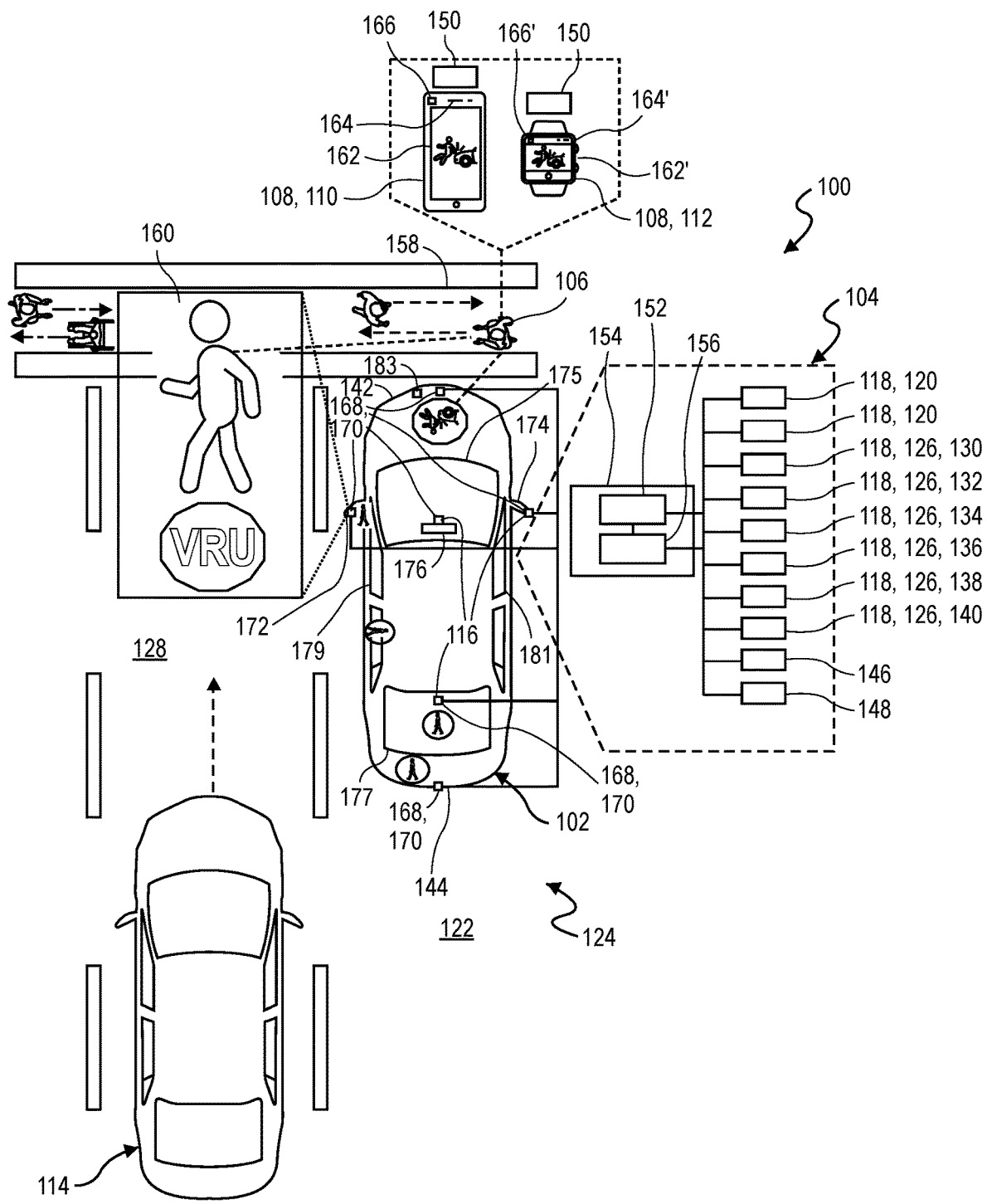
FIG. 1 is a schematic view of one non-limiting example of a warning system using a network and a roadside sensor unit for alerting a Vulnerable Road User ("VRU") of a predicted collision between the VRU and the vehicle when a line of sight between the same is blocked.

Referring to FIG. 1, there is generally illustrated one example of a network 100 including a first vehicle 102 having a warning system 104 ("system") for alerting a Vulnerable Road User 106 ("VRU") of a predicted collision. In one non-limiting example, as described in detail below, the VRU 106 is carrying a VRU notification device 108 (e.g., a smartphone 110, a smart watch 112, a wearable device, and the like) that uses a short-range wireless communication protocol, such as Ultra Wideband (UWB), to communicate with the system 104. Based on this communication, the system 104 may determine a predicted collision between a second vehicle 114 and the VRU 106 at a predicted collision site within a predicted time-to-collision (predicted TTC). The system 104 may send a notification actuation signal to the VRU notification device 108, such that the VRU notification device 108 may notify the VRU of the predicted collision. In another non-limiting example where the VRU 106 does not possess the VRU notification device 108, the system 104 may use one or more input devices (e.g., various suitable RADAR sensors) to determine the predicted collision between the second vehicle 114 and the VRU 106 at the predicted collision site within the predicted TTC. The system 104 may send the notification actuation signal to one or more vehicle notification devices 116 (e.g., light projectors, a horn, speakers, etc.), such that the vehicle notification device 116 may notify the VRU 106 of the predicted collision. Non-limiting examples of the VRUs can include individuals located on or alongside a roadway without the protective rigid covering of a metal automobile, such as a pedestrian, a roadway worker, an individual operating a wheelchair or other personal mobility device, whether motorized or not, an individual operating an electric scooter or the like, an individual operating a bicycle or other non-motorized means of transportation, and individuals operating a motorcycle.

The system 104 includes one or more input devices 118. In this non-limiting example, the system 104 include a first input device 120 (e.g., radar sensor) for transmitting a first input signal associated with the first vehicle 102 positioned in a first lane 122 of a roadway 124. The system 104 further includes a second input device 126 for transmitting a second input signal associated with the second vehicle 114 positioned in a second lane 128 of the roadway 124 adjacent to the first lane 122. The second input device 126 may include a V2X module 130 generating the second input signal in response to the second input device 126 receiving data from adjacent roadway infrastructure, other vehicles, or a remote computer. Non-limiting examples of the first and/or second input devices 120, 126 can include one or more short range RADAR sensors 132, Light Detection and Ranging sensors 134 (LiDAR sensor"), Millimeter-Wave RADAR sensors 136 ("MWR sensors"), infrared cameras 138, stereo vision camera sensors 140, and/or other suitable sensors mounted to a front end structure 142 of the first vehicle 102, a rear end structure 144 of the first vehicle 102, or other suitable portions of the first vehicle 102. Specifically, the second input device 126 can include the V2X module 130 for receiving a second input signal associated with a location and a velocity of the second vehicle 114. Each one of the first and second input devices 120, 126 can be stand-alone devices mounted to the first vehicle 102 or integral components of other systems, e.g., a Forward Collision Mitigation system 146 ("FCM system"). It is contemplated that fusion of data from multiple different sensors can bring redundancy and complementary characteristics of sensors for improving the reliability and accuracy of the sensors.

In one non-limiting example, the system 104 further includes an Ultra Wideband beacon 148 (UWB beacon) capable of being attached to the first vehicle 102, and the UWB beacon 148 may include three or more Ultra Wideband anchors (UWB anchors). The system 104 may further include a VRU notification device 108 that is carried by the VRU 106 and includes an Ultra Wideband tag 150 (UWB tag) in communication with the UWB beacon 148. Non-limiting examples of the VRU notification device 108 may include a smartphone 110, a smart watch 112, a wearable device, and the like. A location of the UWB tag 150 is trackable by way of a third input signal generated by the UWB tag 150. More specifically, the UWB beacon 148 broadcasts a UWB region request message, in response to the UWB beacon receiving a first broadcast actuation signal from a (e.g., when the VRU 106 and the VRU notification device 108 are positioned within a predetermined radius of the UWB beacon 148). The UWB beacon 148 receives a UWB renew response message from the VRU notification device 108, in response to the UWB tag 150 receiving the UWB region request message from the UWB beacon 148. The UWB renew response message includes a temporary identification and a VRU status associated with the VRU notification device 108.

The system 104 further includes a computer 154 capable of being attached to the first vehicle 102. In one non-limiting example, the computer 154 can be an External Object Calculating Module ("EOCM"), which is a central computer for two or more vehicle safety systems. In another non-limiting example, the system 104 can include a Controller Area Network ("CAN bus") for allowing multiple microcontrollers and devices of other systems, e.g., the FCM system 146 and others, to communicate with the applications of one another without the dedicated computer 154. The computer 154 includes one or more of the processors 152 for communicating with the input devices 118. In this non-limiting example, the processor 152 receives the first and second input signals from an associated one of the first and second input devices 120, 126. The processor 152 further communicates with the UWB beacon 148 and receives the third input signal from the UWB beacon 148.

The computer 154 further includes a non-transitory computer readable storage medium 156 ("CRM") storing instructions, such that the processor 152 is programmed to determine the predicted collision between the second vehicle 114 and the VRU 106 at the predicted collision site within a predicted time-to-collision (predicted TTC) based on the second and third input signals. More specifically, the processor 152 is programmed to determine that a detected object is the VRU 106, in response to the processor 152 receiving the third input signal from the UWB beacon 148. The processor 152 further determines a location, a velocity, and a heading of the VRU 106, in further response to the processor 152 receiving the third input signal from the UWB beacon 148. The processor 152 is programmed to determine the location, an azimuth, the temporary identification, and the VRU status of the VRU notification device 108 based on the return message that the processor 152 received from the UWB beacon 148. The processor 152 is further programmed to determine that the VRU is travelling toward the predicted collision site in the crosswalk, in response to the processor 152 determining the location, the azimuth, the temporary identification, and the VRU status of the VRU notification device.

In one non-limiting example, the processor 152 can be programmed to utilize any suitable Deep Neural Network ("DNN"), e.g., a Convolutional Neural Network ("CNN"), to determine that: the detected object is the VRU 106; another detected object is the second vehicle 114; and the VRU 106 and the second vehicle 114 are travelling on an associated one of first and second paths to imminently collide with one another, in response to the processor 152 receiving second input signal from the second input device 126 and the third input signal from the UWB beacon 148. The CRM 156 further stores instructions, such that the processor 152 is programmed to determine the predicted collision between the second vehicle 114 and the VRU 106 at the predicted collision site within a predicted time-to-collision (predicted TTC) based on the second and third input signals.

The processor 152 is programmed to determine the location, an azimuth, the temporary identification, and the VRU status of the VRU notification device 108 based on the return message that the processor 152 received from the UWB beacon 148. The processor 152 is further programmed to determine that the VRU is travelling toward the predicted collision site in the crosswalk, in response to the processor 152 determining the location, the azimuth, the temporary identification, and the VRU status of the VRU notification device. The processor 152 is further programmed to generate the notification actuation signal in further response to the processor determining that the VRU is travelling toward the predicted collision site in the crosswalk.

The processor 152 is further programmed to generate the notification actuation signal in further response to the processor determining that the VRU is travelling toward the predicted collision site in the crosswalk. More specifically, the processor 152 is programmed to generate the notification actuation signal, in response to the processor 152 determining the predicted collision, with the notification actuation signal being associated with the VRU 106 positioned at a tracked location. The VRU notification device 108 may compare the location of the VRU notification device 108 to the tracked location, in response to the VRU notification device receiving the notification actuation signal from the processor. The VRU notification device 108 may notify the VRU 106 that the second vehicle 114 is headed toward the predicted collision site in the crosswalk, in response to the VRU notification device 108 determining that the location of the VRU notification device matches the tracked location of the VRU notification device 108. The UWB beacon 148 may transmit the notification actuation signal to the VRU notification device 108, in further response to the processor determining that a calculated positioning and a movement of the UWB tag are matching one another. The UWB beacon 148 may transmit the notification actuation signal to the VRU notification device 108, in response to the processor determining that the VRU notification device 108 is being used by the VRU 106.

The processor 152 is further programmed to determine that the first vehicle 102 has a heading toward the VRU 106 and the first vehicle 102 is waiting for the VRU 106 to travel across a crosswalk 158, in response to the processor 152 receiving the first and third input signals from an associated one of the first input device 120 and the UWB beacon 148. The processor 152 is further programmed to determine that the second vehicle 114 is travelling toward a predicted collision site 160 in the crosswalk, in response to the processor 152 receiving the second and third input signals from an associated one of the second input device 126 and the UWB beacon 148. The processor 152 is further programmed to generate the notification actuation signal in further response to the processor determining that the first vehicle has a heading toward the VRU and the first vehicle is waiting for the VRU to travel across the crosswalk. The processor 152 is further programmed to generate the notification actuation signal, in further response to the processor determining that the second vehicle is travelling toward the predicted collision site in the crosswalk.

The processor 152 is further programmed to determine a predicted time-to-collision (predicted TTC), in response to the processor 152 receiving the first and third input signals from an associated one of the first input device 120 and the UWB beacon 148. The processor 152 is further programmed to compare the predicted TTC to a predetermined time threshold. The processor 152 is further programmed to generate the notification actuation signal in further response to the processor determining that the predicted TTC is less than the predetermined time threshold.

The processor 152 is further programmed to determine that the second vehicle 114 is located at a closing distance from the predicted collision site, in response to the processor 152 receiving the second and third input signals from an associated one of the second input device 126 and the UWB beacon 148. The processor 152 is further programmed to compare the closing distance to a predetermined distance threshold. The processor 152 is further programmed to generate the notification actuation signal, in further response to the processor determining that the closing distance is less than the predetermined distance threshold.

In another non-limiting example, the processor 152 may be further programmed to generate the notification actuation signal, in further response to the processor 152 determining that the VRU 106 is not positioned within a line of sight of the second vehicle 114 based on the first, second, and third input signals.

The system 104 further includes the VRU notification device 108 carried by the VRU 106, with the VRU notifying the VRU 106 of the predicted collision in response to the VRU notification device 108 receiving the notification actuation signal from the processor 152. One non-limiting example of the VRU notification device 108 may include a smartphone 110 having a display device 162 for displaying a visible alert related to the VRU, a speaker 164 for emitting an audible alert related to the VRU, and a haptic device 166. Another non-limiting example of the VRU notification device 108 may include a smart watch 112 having the display device 162', the speaker 164', and the haptic device 166'. Other non-limiting examples of the VRU notification device can be any wearable device or other suitable mobile devices having the display device, the speaker, and/or the haptic device.

The system 104 further includes a vehicle notification device 116 attached to the first vehicle 102. The vehicle notification device 116 receives the notification actuation signal, in response to the processor 152 determining that the calculated positioning and the movement of the UWB tag 150 are not matching one another. The vehicle notification device 116 notifies the VRU 106 that the second vehicle 114 is headed toward the predicted collision site in the crosswalk, in response to the vehicle notification device 116 receiving the notification actuation signal from the processor 152. The vehicle notification device 116 receives the notification actuation signal, in response to the processor 152 determining that the VRU notification device 108 is not being used by the VRU 106. One non-limiting examples of the vehicle notification device 116 include a display device 168 for displaying a visible alert related to the VRU 106. The display devices 168 can include one or more light projectors 170 coupled to the processor 152, with the light projector 170 projecting a light in an outboard direction from the first vehicle 102 to indicate to the VRU 106 that the VRU 106 and the second vehicle 114 are travelling on an associated one of first and second paths to imminently collide with one another, in response to the light projector 170 receiving the notification actuation signal from the processor 152. The light projector 170 can be mounted to mounted to one or both side view mirror assemblies 172, 174, a rear view mirror assembly 176, the front end structure 142, the rear end structure 144, or other suitable portions of the first vehicle 102. In one non-limiting example, the light projector 170 is configured to project the light onto a portion of a roadway 124 that is positioned adjacent to the first vehicle 102 and within the line of sight of the VRU 106. The light projector 170 is configured to project the light in the form of at least one of a pattern, a symbol, and a word that indicate to the VRU 106 and/or the second vehicle 114 that the VRU 106 and the second vehicle 114 are travelling on an associated one of first and second paths to imminently collide with one another. As but one example, two light projectors 170 can be attached to an associated one of a driver-side sideview mirror assembly 172 and a passenger-side sideview mirror assembly 174 for illuminating, with or without a strobe effect, the term "VRU" on a portion of the roadway surface that is within the line of sight of the VRU 106. In other examples, the light projector 170 can be configured to project the light onto a screen attached to a front windshield 175, a rear windshield 177, driver side window 179, a passenger side window 181, an outboard facing surface of any body panel, or directly toward the VRU. In another non-limiting example, the vehicle notification device 116 can be a speaker 183 (e.g., a horn) for emitting an audible alert related to the predicted collision.

Figure 2:
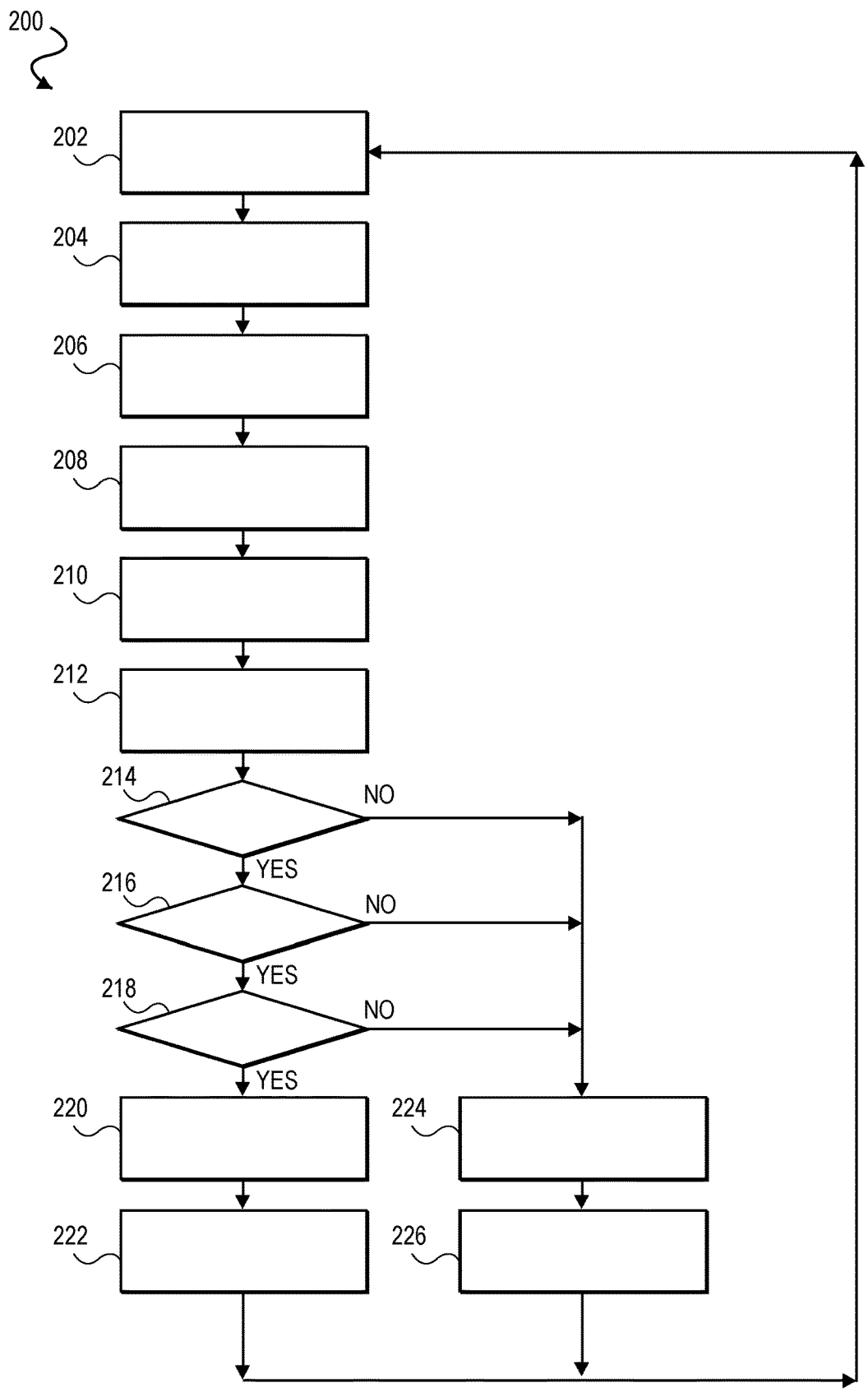
FIG. 2 is a flow chart of one non-limiting example of a method for operating the warning system of FIG. 1.

Referring to FIG. 2, one non-limiting example of a method 200 is provided for operating the warning system 104 of the first vehicle 102. The method 200 begins at block 202 with transmitting, using the first input device 120, the first input signal associated with data for the first vehicle 102 positioned in the first lane 122 (e.g., the heading, the location, the velocity, images of surrounding environment including traffic lights, traffic signs, road geometry, road markers, and the like). The method 200 further includes transmitting, using the second input device 126, the second input signal associated with data for the second vehicle 114 (e.g., the heading, the location, the velocity, a status of a brake module such as a brake pedal position, a status of a propulsion system such as an accelerator pedal position, a status of a Driver Monitoring System, and the like) positioned in the second lane 128 of the roadway 124. The method further includes transmitting, using the UWB beacon 148, the third input signal associated with data for the UWB tag 150 of the VRU notification device 108 carried by the VRU 106 travelling on the crosswalk 158 (e.g., the heading, the location, the velocity, and the like). In another non-limiting example, a camera sensor and/or a RADAR sensor can transmit the third input signal associated with data for the VRU 106 (locations, images of the VRU 106, and the like).

In one non-limiting example, the UWB beacon 148 may use a Personal Area Network (PAN, such as 5G) to wirelessly communicate with the UWB tag 150 of the VRU notification device and then use UWB to wirelessly communicate with the UWB tag 150. More specifically, the UWB beacon 148 broadcasts the UWB region request message, in response to the UWB beacon receiving the first broadcast actuation signal from the processor 152 (e.g., when the VRU notification device 108 that is carried by the VRU 106 is positioned within a predetermined radius of the UWB beacon 148 of the first vehicle 102). The UWB beacon 148 receives the UWB renew response message from the VRU notification device 108, in response to the UWB tag 150 receiving the UWB region request message from the UWB beacon 148. The UWB renew response message includes a temporary identification and a VRU status associated with the VRU notification device 108. The method 200 then proceeds to block 204.

At block 204, the method 200 further includes determining, using the processor 152, that the first vehicle 102 is positioned in the first lane 122, in response to the processor 152 receiving the first input signal from the first input device 120. The method 200 further includes determining, using the processor 152, that the first vehicle 102 has parameters associated with the first vehicle 102 approaching or fully stopped at the crosswalk 158, in response to the processor 152 receiving the first input signal from the first input device 120. Non-limiting examples of these parameters include the location of the crosswalk 158, the heading of the first vehicle 102 being directed toward the crosswalk 158, the first vehicle being located within a predetermined distance from the crosswalk 158, the velocity of the first vehicle 102 being less than a velocity threshold, a status of a brake module such as a brake pedal position, a status of a propulsion system such as an accelerator pedal position, and the like. The method 200 further includes determining, using the processor 152, one or more parameters associated with the second vehicle 114 travelling toward the crosswalk 158 to imminently collide with the VRU 106 in the crosswalk 158. The method 200 then proceeds to block 206.

At block 206, the method 200 further includes determining, using the processor 152, that the detected object associated with the second input signal is the second vehicle 114 travelling in the second lane 128, in response to the processor 152 receiving the second input signal from the second input device 126. The method 200 further includes determining, using the processor 152, one or more parameters associated with the second vehicle including the heading, the location, the velocity, a status of a brake module such as a brake pedal position, a status of a propulsion system such as an accelerator pedal position, a status of a Driver Monitoring System, and the like. The method 200 then proceeds to block 208.

At block 208, the method 200 further includes determining, using the processor 152, that the detected object associated with the third input signal is the VRU 106, in response to the processor 152 receiving the third input signal from the UWB beacon 148. In one non-limiting example, the processor 152 may determine that the detected object is the VRU 106, in further response to the processor 152 having a classification module determine that images of the detected object are associated with the VRU 106. The method 200 further includes determining, using the processor 152, one or more parameters associated with the VRU 106. Non-limiting examples of these parameters include the heading of the VRU 106, the location of the VRU 106, the velocity of the VRU 106, and the like.

At block 210, the method 200 further includes determining, using the processor 152, that the VRU 106 and the second vehicle 114 are travelling on an associated one of first and second paths to imminently collide with one another based on the second and third input signals. More specifically, the method 200 includes determining, using the processor 152, the location of the VRU 106 in response to the processor 152 receiving the third input signal from the UWB beacon and the communication between the UWB beacon 148 and the UWB tag 150. The method 200 includes determining, using the processor 152, the predicted collision between the second vehicle 114 and the VRU 106 at the predicted collision site within the predicted TTC based on the second and the third input signals. The method 200 then proceeds to block 212.

At block 212, the method 200 further includes generating, using the processor 152, the notification actuation signal in response to the processor 152 determining the predicted collision, with the notification actuation signal being associated with the VRU 106 positioned at a tracked location. The method 200 proceeds to block 214.

At block 214, the method 200 further includes determining, using the processor 152, whether the processor 152 received the return message from the UWB beacon 148. If the processor 152 determines that the processor 152 received the return message from the UWB beacon 148, the method 200 proceeds to block 216. If the processor 152 determines that the processor 152 did not receive the return message from the UWB beacon 148, the method 200 proceeds to block 224.

At block 216, the method 200 further includes determining, using the processor 152, whether the VRU notification device 108 is being used by the VRU 106. In one limiting example, based on the return message, the processor 152 may determine whether the VRU notification device 108 (e.g., the display device 162 and/or speaker 164, etc.) is powered on to display an image and/or emit sound (i.e., has not entered a shutdown mode, sleep mode, or hibernate mode). If the processor 152 determines that the VRU notification device 108 is being used by the VRU 106, the method 200 proceeds to block 218. If the processor 152 determines that the VRU notification device is not being used by the VRU 106, the method 200 proceeds to block 224.

At block 218, the method 200 further includes determining, using the VRU notification device 108, whether the VRU notification device 108 is intended to receive the notification signal. In this non-limiting example, the method 200 includes comparing, using the VRU notification device 108, the location of the VRU notification device 108 to the tracked location associated with the notification actuation signal. If VRU notification device 108 determines that the location of the VRU notification device 108 matches the tracked location associated with the notification actuation signal, the method 200 proceeds to block 220. If processor 152 determines that the location of the VRU notification device 108 does not match the tracked location associated with the notification actuation signal, the method 200 proceeds to block 224.

At block 220, the method 200 further includes transmitting, using the UWB beacon 148, the notification actuation signal to the VRU notification device 108, in response to the processor 152 determining that: the UWB beacon 148 received the UWB region return message from the UWB tag 150 of the VRU notification device 108; the calculated positioning and the movement of the UWB tag 150 match one another; and the VRU notification device 108 is being used by the VRU. The method 200 the proceeds to block 222.

At block 222, the method 200 further includes notifying, using the VRU notification device 108, the VRU 106 that the second vehicle 114 is headed toward the predicted collision site 160 in the crosswalk 158, in response to the VRU notification device 108 determining that the location of the VRU notification device 108 matches the tracked location associated with the notification actuation signal. In one non-limiting example, the smartphone 110 may actuate the display device 162 to display the visible alert related to the VRU 106, the speaker 164 to emit the audible alert related to the predicted collision, and/or the haptic device 166. In another non-limiting example, similar to the smartphone 110, the smart watch 112 may actuate the associated display device 162', the associated speaker 164', and the associated haptic device 166'. Other non-limiting examples of the VRU notification device can be any wearable device or other suitable mobile devices having the display device, the speaker, and/or the haptic device. The method 200 then returns to block 202.

At block 224, the method 200 further includes receiving, using the vehicle notification device 116, the notification actuation signal in response to the processor determining that: the UWB beacon 148 did not receive the UWB region return message from the UWB tag 150 of the VRU notification device 108; the calculated positioning and movement of the UWB tag 150 do not match one another; and the VRU notification device 108 is not being used by the VRU 106. The method 200 the proceeds to block 226

At block 226, the method 200 further includes notifying, using the vehicle notification device, the VRU that the second vehicle 114 is headed toward the predicted collision site 160 in the crosswalk 158 in response to the vehicle notification device 116 receiving the notification actuation signal from the processor 152. As but one example, the two light projectors 170 mounted to the driver-side sideview mirror assembly 172 and the passenger-side sideview mirror assembly 174 project, with or without a strobe effect, the term "VRU" on a portion of the roadway surface that is within the line of sight of the VRU 106. In other examples, the light projector 170 projects the light onto the screen attached to the front windshield 175, the rear windshield 177, the driver side window 179, the passenger side window 181, the outboard facing surface of any body panel, or directly toward the VRU. In another non-limiting example, the speaker 183 (e.g., a horn) emits the audible alert related to the predicted collision. The method 200 then returns to block 202.

In general, the computing systems and/or devices described may employ any of a number of computer operating systems, including, but by no means limited to, versions and/or varieties of the ANDROID AUTOMOTIVE OS developed by GOOGLE INC., the MICROSOFT WINDOWS operating system, the UNIX operating system (e.g., the SOLARIS operating system distributed by ORACLE Corporation of Redwood Shores, California), the AIX UNIX operating system distributed by INTERNATIONAL BUSINESS MACHINES of Armonk, New York, the LINUX operating system, the MAC OSX and iOS operating systems distributed by APPLE INC. of Cupertino, California, the BLACKBERRY OS distributed by BLACKBERRY LTD. of Waterloo, Canada, and the OPEN HANDSET ALLIANCE, or the QNX CAR Platform for Infotainment offered by QNX Software Systems. Examples of computing devices include, without limitation, an on board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA, C, C++, MATLAB, SIMULINK, STATEFLOW, VISUAL BASIC, JAVA SCRIPT, PERL, HTML, TENSORFLOW, PYTORCH, KERAS, etc. Some of these applications may be compiled and executed on a virtual machine, such as the JAVA VIRTUAL MACHINE, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The CRM that participates in providing data (e.g., instructions) may be read by the computer (e.g., by a processor of a computer and may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system, such as one of those mentioned above, and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A warning system for alerting a Vulnerable Road User (VRU) of a predicted collision, the warning system comprising:
at least one input device for transmitting a first input signal associated with a first vehicle positioned in a first lane of a roadway and a second input signal associated with a second vehicle positioned in a second lane of the roadway adjacent to the first lane, wherein the at least one input device is a sensor mounted to the first vehicle;
an Ultra Wideband beacon (UWB beacon) attached to the first vehicle, the UWB beacon for communicating with an Ultra Wideband tag (UWB tag) of a VRU notification device that is carried by the VRU, and a location of the UWB tag being trackable by way of a third input signal;
a light projector disposed on the first vehicle, the light projector configured to project a light in an outboard direction from the first vehicle;
a computer attached to the first vehicle, the computer comprising:
at least one processor communicating with the at least one input device and receiving the first and second input signals from the at least one input device, and the at least one processor further communicating with the UWB beacon and receiving the third input signal from the UWB beacon; and
a non-transitory computer readable storage medium (CRM) for storing instructions, such that the at least one processor is programmed to:
determine a location of the VRU in response to the at least one processor receiving the third input signal from the UWB beacon;
determine the predicted collision between the second vehicle and the VRU at a predicted collision site within a predicted time-to-collision based on the second and the third input signals; and
command the light projector to project light in the outboard direction from the first vehicle indicative of the predicted collision;
generate a notification actuation signal in response to the at least one processor determining the predicted collision, with the notification actuation signal associated with the VRU positioned at a tracked location; and
transmit, using the UWB beacon, the notification actuation signal to the VRU notification device in response to the at least one processor determining that the location of the VRU notification device and the tracked location of the VRU notification device are matching one another;
where the VRU notification device compares the location of the VRU notification device to the tracked location associated with the notification actuation signal, in response to the VRU notification device receiving the notification actuation signal from the at least one processor; and
where the VRU notification device notifies the VRU that the second vehicle is headed toward the predicted collision site in a crosswalk in response to the VRU notification device determining that the location of the VRU notification device matches the tracked location of the VRU notification device.

2. The warning system of claim 1 wherein the UWB beacon transmits the notification actuation signal to the VRU notification device in further response to the at least one processor determining that the VRU notification device is being used by the VRU.

3. The warning system of claim 2 further comprising a vehicle notification device attached to the first vehicle, the vehicle notification device for receiving the notification actuation signal in response to the at least one processor determining that the the location of the VRU notification device and the tracked location of the VRU notification device are not matching one another, and the vehicle notification device notifies the VRU that the second vehicle is headed toward the predicted collision site in the crosswalk in response to the vehicle notification device receiving the notification actuation signal from the at least one processor.

4. The warning system of claim 3 wherein the vehicle notification device receives the notification actuation signal in response to the at least one processor determining that the VRU notification device is not being used by the VRU.

5. The warning system of claim 4 wherein the vehicle notification device comprises at least one of a display device for displaying a visible alert related to the VRU and a speaker for emitting an audible alert related to the VRU.

6. The warning system of claim 5 wherein the UWB beacon broadcasts a UWB region request message in response to the UWB beacon receiving a first broadcast actuation signal from the at least one processor, and the UWB beacon receives a UWB renew response message from the VRU notification device, with the UWB renew response message including a temporary identification and a VRU status associated with the VRU notification device.

7. The warning system of claim 6 wherein the at least one processor is further programmed to:
determine the location, an azimuth, the temporary identification, and the VRU status of the VRU notification device based on a return message received from the UWB tag;
determine that the VRU is travelling toward the predicted collision site in the crosswalk in response to the at least one processor determining the location, the azimuth, the temporary identification, and the VRU status of the VRU notification device; and
generate the notification actuation signal in further response to the at least one processor determining that the VRU is travelling toward the predicted collision site in the crosswalk.

8. The warning system of claim 7 wherein the at least one processor is further programmed to:
determine that the first vehicle has a heading toward the VRU and the first vehicle is waiting for the VRU to travel across the crosswalk in response to the at least one processor receiving the first and third input signals from the at least one input device; and
generate the notification actuation signal in further response to the at least one processor determining that the first vehicle has a heading toward the VRU and the first vehicle is waiting for the VRU to travel across the crosswalk.

9. The warning system of claim 8 wherein the at least one processor is further programmed to:
determine that the second vehicle is travelling toward the predicted collision site in the crosswalk in response to the at least one processor receiving the second and third input signals from the at least one input device; and
generate the notification actuation signal in further response to the at least one processor determining that the second vehicle is travelling toward the predicted collision site in the crosswalk.

10. The warning system of claim 4 wherein the at least one processor is further programmed to:
determine a predicted time-to-collision (predicted TTC) in response to the at least one processor receiving the first and third input signals from the at least one input device;
compare the predicted TTC to a predetermined time threshold; and
generate the notification actuation signal in further response to the at least one processor determining that the predicted TTC is less than the predetermined time threshold.

11. The warning system of claim 4 wherein the at least one processor is further programmed to:
determine that the second vehicle is located at a closing distance from the predicted collision site in response to the at least one processor receiving the second and third input signals from the at least one input device;
compare the closing distance to a predetermined distance threshold; and
generate the notification actuation signal in further response to the at least one processor determining that the closing distance is less than the predetermined distance threshold.

12. The warning system of claim 4 wherein the VRU notification device comprises at least one of a display device for displaying a visible alert related to the VRU, a speaker for emitting an audible alert related to the VRU, and a haptic device.

13. A computer of a warning system for alerting a Vulnerable Road User (VRU) of a predicted collision, with the warning system including at least one input device and an Ultra Wideband beacon (UWB beacon) capable of being attached to a first vehicle, the computer comprising:
at least one processor communicating with the at least one input device and receiving first and second input signals from the at least one input device, the first input signal being associated with a first vehicle positioned in a first lane of a roadway, and the second input signal being associated with a second vehicle positioned in a second lane of the roadway adjacent to the first lane, wherein the at least one input device is a sensor mounted to the first vehicle, and the at least one processor further communicates with the UWB beacon that is capable of being attached to the first vehicle, with the UWB beacon receiving a third input signal from a UWB tag of a VRU notification device that is carried by the VRU, and a location of the UWB tag is trackable by way of a third input signal, and the at least one processor further communicates with a light projector disposed on the first vehicle, the light projector configured to project a light in an outboard direction from the first vehicle; and
a non-transitory computer readable storage medium (CRM) for storing instructions, such that the at least one processor is programmed to:
determine a location of the VRU in response to the at least one processor receiving the third input signal from the UWB beacon;
determine the predicted collision between the second vehicle and the VRU at a predicted collision site within a predicted time-to-collision based on the second and the third input signals;
command the light projector to project light in the outboard direction from the first vehicle indicative of the predicted collision;
generate a notification actuation signal in response to the at least one processor determining the predicted collision, with the notification actuation signal associated with the VRU positioned at a tracked location; and
transmit the notification actuation signal to the VRU notification device in response to the at least one processor determining that the location of the VRU notification device and the tracked location of the VRU notification device are matching one another;
where the VRU notification device compares the location of the VRU notification device to the tracked location associated with the notification actuation signal, in response to the VRU notification device receiving the notification actuation signal from the at least one processor; and
where the VRU notification device notifies the VRU that the second vehicle is headed toward the predicted collision site in a crosswalk in response to the VRU notification device determining that the location of the VRU notification device matches the tracked location of the VRU notification device.

14. The computer of claim 13 wherein the at least one processor is further programmed to transmit the notification actuation signal to the VRU notification device in further response to the at least one processor determining that the VRU notification device is being used by the VRU.

15. The computer of claim 14 wherein the at least one processor is programmed to transmit the notification actuation signal to a vehicle notification device attached to the first vehicle, in response to the at least one processor determining that the the location of the VRU notification device and the tracked location of the VRU notification device are not matching one another and in further response to the at least one processor determining that the VRU notification device is not being used by the VRU.

16. A method of operating a warning system of a first vehicle for alerting a Vulnerable Road User (VRU) of a predicted collision, the warning system including at least one input device, wherein the at least one input device is a sensor mounted to the first vehicle, a UWB beacon, a light projector disposed on the first vehicle, the light projector configured to project a light in an outboard direction from the first vehicle, and a computer having a non-transitory computer readable storage medium (CRM) and at least one processor, the method comprising:
determining, using the at least one processor, a location of the VRU in response to the at least one processor receiving a third input signal from the UWB beacon;
determining, using the at least one processor, the predicted collision between a second vehicle and the VRU at a predicted collision site within a predicted time-to-collision based on a second input signal and the third input signal;
generating, using the at least one processor, a notification actuation signal in response to the at least one processor determining the predicted collision, with the notification actuation signal associated with the VRU positioned at a tracked location;
comparing, using a VRU notification device, the location of the VRU notification device to the tracked location associated with the notification actuation signal, in response to the VRU notification device receiving the notification actuation signal from the at least one processor;

commanding the light projector to project light in the outboard direction from the first vehicle indicative of the predicted collision;

notifying, using the VRU notification device, the VRU that the second vehicle is headed toward the predicted collision site in a crosswalk in response to the VRU notification device determining that the location of the VRU notification device matches the tracked location associated with the notification actuation signal transmitting, using the UWB beacon, the notification actuation signal to the VRU notification device in response to the at least one processor determining that the location of the VRU notification device and the tracked location of the VRU notification device are matching one another; and transmitting, using the UWB beacon, the notification actuation signal to the VRU notification device in further response to the at least one processor determining that the VRU notification device is being used by the VRU.

17. The method of claim 16 further comprising:

receiving, using a vehicle notification device attached to the first vehicle, the notification actuation signal in response to the at least one processor determining that the the location of the VRU notification device and the tracked location of the VRU notification device are not matching one another and in further response to the at least one processor determining that the VRU notification device is not being used by the VRU; and notifying, using the VRU notification device, the VRU that the second vehicle is headed toward the predicted collision site in the crosswalk in response to the vehicle notification device receiving the notification actuation signal from the at least one processor.

* * * * *